United States Patent [19]

Miyata

[11] Patent Number: 4,914,715

[45] Date of Patent: Apr. 3, 1990

[54] FM RECEIVING CIRCUIT

[75] Inventor: Shinji Miyata, Tokyo, Japan

[73] Assignee: NEC Corporation, Japan

[21] Appl. No.: 283,182

[22] Filed: Dec. 12, 1988

[30] Foreign Application Priority Data

Dec. 18, 1987 [JP] Japan .................. 62-320691

[51] Int. Cl.⁴ .................................................. H04B 1/10
[52] U.S. Cl. ..................................... 455/212; 455/213; 455/221
[58] Field of Search ............... 455/214, 215, 263, 337, 455/336, 212, 213, 220, 221, 205, 222; 381/13

[56] References Cited

U.S. PATENT DOCUMENTS 4,087,641 5/1978 Sugai ..................................... 455/212

FOREIGN PATENT DOCUMENTS 0023332 2/1982 Japan ..................................... 455/212
0164329 9/1983 Japan ..................................... 455/212
0190748 10/1984 Japan ..................................... 455/212

*Primary Examiner*—Reinhard J. Eisenzopf
*Assistant Examiner*—Curtis Kuntz
*Attorney, Agent, or Firm*—Laff, Whitesel, Conte & Saret

[57] ABSTRACT

An FM receiving circuit is provided with a front end section operative to select an FM signal from FM broadcasting signals and producing an intermediate frequency signal on the basis of the FM signal, and an audio signal producing section supplied with the intermediate frequency signal for producing audio signals and responsive to a first control signal for eliminating noise components due to a rapid variation in the electric field strength of the FM signal, and the audio signal producing section is associated with a level detecting circuit supplied with an intermediate frequency signal transferred from the audio signal producing section and producing a voltage signal representative of an envelope of the intermediate frequency signal, a low-pass filter circuit providing a time constant for producing the first control signal on the basis of the voltage signal and responsive to a second control signal for variation in the time constant, a high-pass filter circuit operative to differentiate the voltage signal for producing a differential signal, and a rectifier circuit operative to rectify the differential signal for producing the second control signal, so that the audio signal producing section can quickly respond to the first control signal even if the FM signal is rapidly varied in the electric field strength.

7 Claims, 4 Drawing Sheets

PRIOR-ART

FM RECEIVING CIRCUIT

FIELD OF THE INVENTION

This invention relates to an FM (frequency-modulated signal) receiving circuit and, more particularly, to an FM receiving circuit suitable for installation in a vehicle.

BACKGROUND OF THE INVENTION

An FM receiving circuit is generally equipped with a muting circuit for improvement of stereophonic audio signals in the S/N ratio, and the muting circuit is responsive to a voltage signal supplied from a level detecting circuit provided for detecting an envelope of an intermediate frequency signal produced from a tuned FM signal. The FM receiving circuit is further equipped with a switching circuit which is operative to shift the mode of operation between a stereophonic mode and a monaural mode depending upon the level of the FM signal for improvement in the S/N ratio, thereby preventing the audio sounds from noises. The shifting function is sometimes referred to as "high-blend function".

A typical example of the FM receiving circuit is illustrated in FIG. 1 of the drawings and comprises a front end section 1 coupled to an antenna terminal 2, an intermediate frequency signal amplifier circuit 3, an FM detector circuit 4, a muting circuit 5, an FM demodulation circuit 6 associated with output terminals L and R, a level detecting circuit 7, and a low-pass filter circuit 8 provided with a resistor 9 and a capacitor 10. When the FM receiving circuit is activated, FM signals are received and supplied from the antenna terminal 2 to the front end section 1. The front end section 1 is tuned in a selected frequency range, and, accordingly, the FM signal in the selected frequency range is extracted from the received broadcasting signals. The FM signal is converted into an intermediate frequency signal which is abbreviated as "IF signal", and, then, the intermediate frequency signal is supplied to the intermediate frequency signal amplifier circuit 3. The output of the intermediate frequency signal amplifier circuit 3 is supplied to the FM detecting circuit 4 for demodulation into an FM composite signal. The intermediate frequency signal amplifier circuit 3 is provided with a plurality of amplifier circuits coupled in cascade, and the output signal of each amplifier circuits is detected by the level detecting circuit 7 provided in association therewith, then being summed again. Then, the level detecting circuit 7 produces a voltage signal which traces an envelope of the intermediate frequency signal. In other words, the voltage signal is representative of the electric field strength of the FM broadcasting signal received. The level detecting circuit 7 is further operative to rectify the intermediate frequency signal, and, for this reason, the audio signal is slightly demodulated. As a result, the voltage signal is varied in voltage level by not only the electric field strength of the FM broadcasting signal received but also the audio signal component. On the other hand, the muting circuit 5 starts on the muting operation when a control signal supplied to a control node 5-1 is decreased in voltage level below a predetermined level, and, for this reason, the FM composite signal is blocked by the muting circuit 5. Then, no FM composite signal is supplied to the stereo demodulation circuit 6. When the signal supplied to a control node 6-1 is decreased in voltage level below a predetermined level, the stereo demodulation circuit 6 is operative to gradually decrease the stereo separation factor between a right channel signal and a left channel signal by controlling the high cut off frequency. Thus, the stereo demodulation circuit 6 finally shifts the mode of operation from a stereophonic mode to a monaural mode. If the voltage signal produced by the level detecting circuit 7 is directly supplied to the control nodes 5-1 of the muting circuit 5 as the control signal, the voltage signal tends to deviate from the envelop of the intermediate frequency signal due to the audio signal component contained therein, which sometimes results in unintentional muting functions. Similarly, if the voltage signal is directly supplied to the control node 6-1 of the stereo demodulation circuit 6 as the control signal, the stereo demodulation circuit 6 is liable to decrease the stereo separation factor due to the unintentional decrement in the voltage level due to the audio signal component. In order to avoid these undesirable operation, the low pass filter circuit 8 is coupled between the level detecting circuit 7 and the control nodes 5-1 and 6-1. The low pass filter circuit 8 aims at elimination of the audio signal component from the voltage signal supplied from the level detecting circuit 7, thereby producing a voltage signal which is free from the audio signal component. In other words, the low pass filter circuit 8 is provided for allowing the voltage signal to vary substantially depending upon the electrical field strength only.

However, a problem is encountered in the prior-art FM receiving circuit due to the provision of the low pass filter circuit as follows. When a radio provided with the FM receiving circuit illustrated in FIG. 1 is installed in a vehicle and, then, passes through a shady street or a tunnel, the voltage signal produced in the level detecting circuit 7 is rapidly decreased in voltage level due to reduction of the FM broadcasting signal in the electric field strength. Since the low pass filter circuit 8 is large in time constant for the elimination of the audio signal component, and, for this reason, the voltage signal rapidly decreased in voltage level is rendered slack. The slack voltage signal is supplied to the muting circuit 5 and the stereo demodulation circuit 6 as the control signals and, accordingly, retards the functions thereof. This results in unpleasant noises.

SUMMARY OF THE INVENTION

It is therefor an important object of the present invention to provide an FM receiving circuit which is free from the problem inherent in the prior-art FM receiving circuit shown in FIG. 1 of the drawings.

To accomplish the object, the present invention proposes to change the time constant of the low-pass filter for quick response.

In accordance with the present invention, there is provided an FM receiving circuit comprising (a) a front end section operative to select an FM signal from FM broadcasting signals and producing an intermediate frequency signal on the basis of the FM signal, (b) an audio signal producing section supplied with the intermediate frequency signal for producing audio signals and responsive to a first control signal for eliminating noise components due to a rapid variation in the electric field strength of the FM signal, (c) a level detecting circuit supplied with an intermediate frequency signal transferred from the audio signal producing section and producing a voltage signal representative of an envelope of the intermediate frequency signal, (d) a low-pass filter circuit providing a time constant for producing the first control signal on the basis of the voltage signal and responsive to a second control signal for variation in the time constant, (e) a high-pass filter circuit operative to differentiate the voltage signal for producing a differential signal; and (f) a rectifier circuit operative to rectify the differential signal for producing the second control signal.

BRIEF DESCRIPTION OF THE DRAWINGS

The features and advantages of an FM receiving circuit according to the present invention will be more clearly understood from the following description taken in conjunction with the accompanying drawings in which.

DESCRIPTION OF THE PREFERRED EMBODIMENTS

First embodiment

Figure 1:
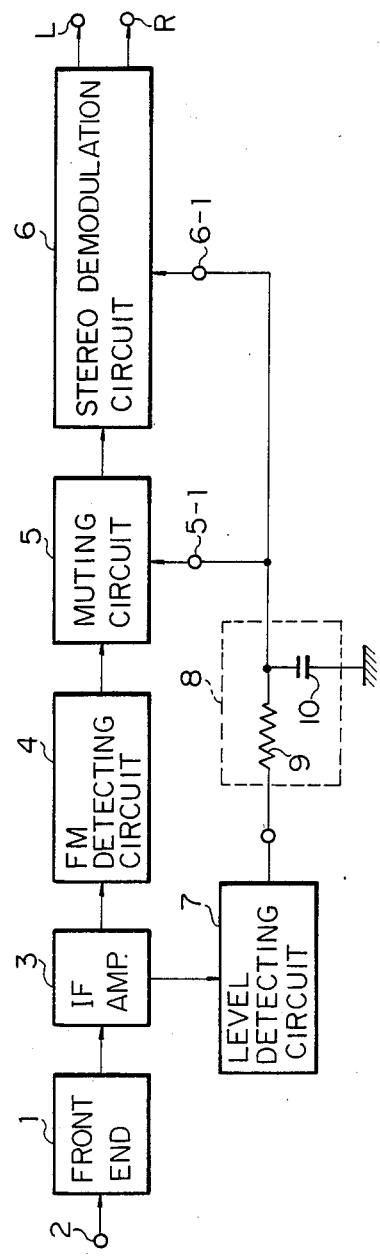
FIG. 1 is a block diagram showing the circuit arrangement of the prior-art FM receiving circuit.
Figure 2:
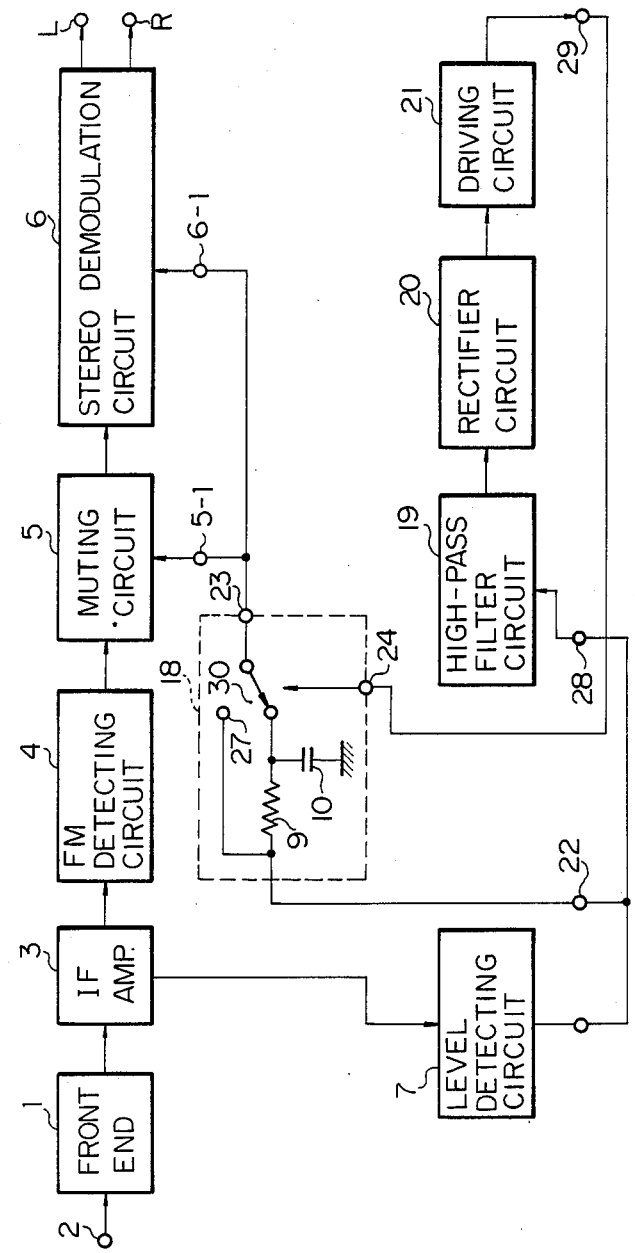
FIG. 2 is a block diagram showing the circuit arrangement of an FM receiving circuit embodying the present invention.

Referring to FIG. 2 of the drawings, there is shown the circuit arrangement of an FM receiving circuit embodying the present invention. A front end section 1, an intermediate frequency signal amplifier circuit 3, an FM detecting circuit 4, a muting circuit 5, an FM demodulation circuit 6 and a level detecting circuit 7 are similar in circuit arrangement to those of the prior-art FM receiving circuit shown in FIG. 1, and, accordingly, no further description is hereinunder incorporated.

The FM receiving circuit further comprises a low-pass filter circuit 18 with variable time constant for producing a first control signal on the basis of a voltage signal produced by the level detecting circuit 7. The low-pass filter circuit 18 is improved in accordance with the present invention and, accordingly, provided with a switch 30 and a bypassing node 27 together with the resistor 9 and the capacitor 10. The FM receiving circuit according to the present invention further comprises a high-pass filter circuit 19 for differentiating the voltage signal, a rectifying circuit 20, and a driving circuit 21. The low-pass filter circuit 18 is coupled at the input node 22 thereof to the level detecting circuit 17 and at the output node 23 to the muting circuit 15 and the FM demodulation circuit 16 in parallel manner. The low-pass filter circuit 18 further has a control node 24 where a second control signal is supplied from the driving circuit 21. The low-pass filter circuit 18 provides a time constant determined by the capacitance of the capacitor 10 and the resistance of the resistor 9, but the time constant is varied in the presence of the second control signal in such a manner as to couple the output node 23 to the bypassing node 27.

Figure 3:
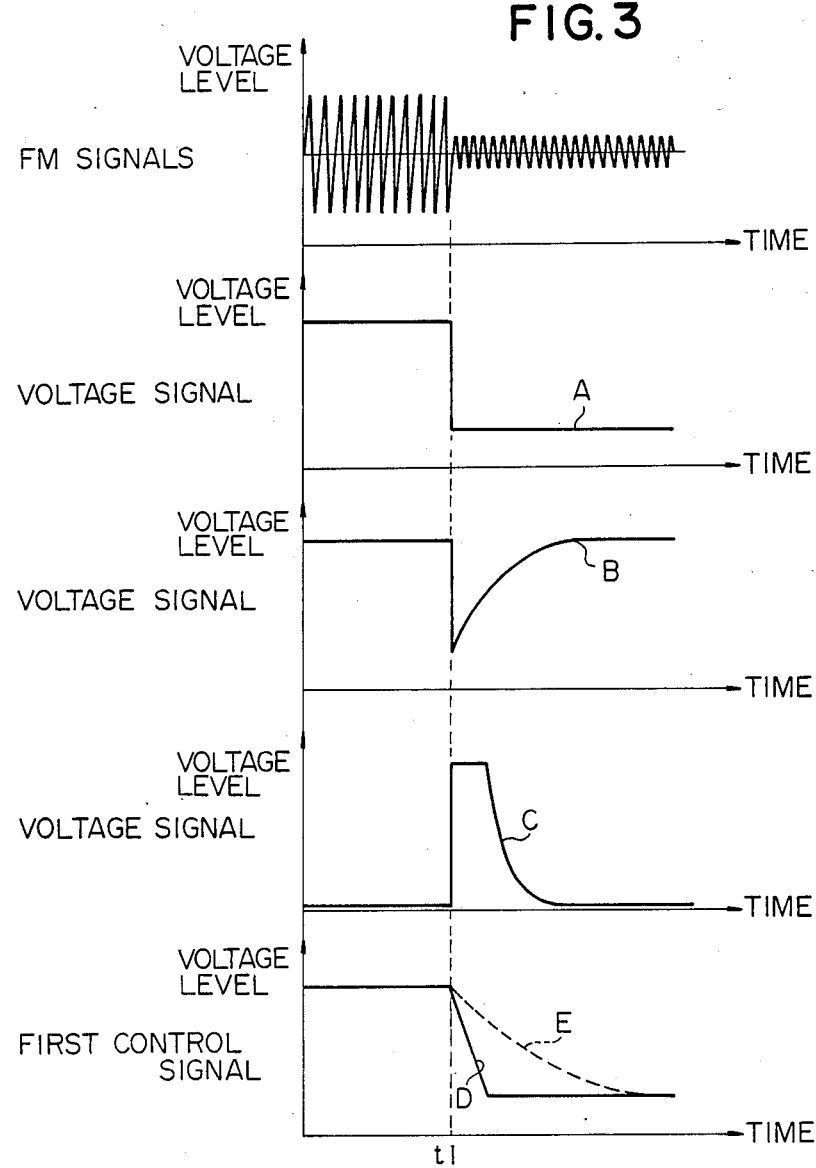
FIG. 3 is a diagram showing the waveforms of essential signals produced in the FM receiving circuit shown in FIG. 2.

Description will be hereinunder made for the circuit behavior of the FM receiving circuit with reference to FIG. 3 of the drawings. If the FM signals are stable in the electric field strength, no second control signal is supplied to the control node 24 of the low pass filter circuit 18. The low-pass filter circuit 18 provides the time constant determined by the resistance of the resistor 9 and the capacitance of the capacitor 10, and the audio signal component is eliminated from the voltage signal supplied from the level detecting circuit 7, thereby allowing the first control signal to control the muting circuit 5 and the stereo demodulation circuit 6 as similar to the prior-art FM receiving circuit.

However, if the FM signals are rapidly decreased in the electric field strength at time t1, the voltage signal produced by the level detecting circuit 7 is also decreased in voltage level as a waveform A. The voltage signal is supplied to not only the low-pass filter circuit 18 but also the high-pass filter circuit 19, and, accordingly, the high-pass filter circuit 19 tailors a waveform B for the output voltage signal thereof. With the waveform B of the voltage signal, the rectifier circuit 20 produces a voltage signal having a waveform C which allows the driving circuit 21 to be activated. When the driving circuit 21 is activated, the switch 30 provides a conduction path between the bypassing node 27 and the output node 23, and, for this reason, the low-pass filter circuit 18 decreases the time constant thereof. The time constant is thus decreased in value, so that low-pass filter circuit 18 produces a waveform D for the first control signal which is rapidly lowered in voltage level in comparison with the waveform E produced by the low-pass filter incorporated in the prior-art FM receiving circuit. With the first control signal rapidly decreased, the muting circuit 15 and the FM demodulation circuit 16 quickly shift the mode of operation so as to cope with the unpleasant noises, thereby being improved in the response characteristics.

Second embodiment

Figure 4:
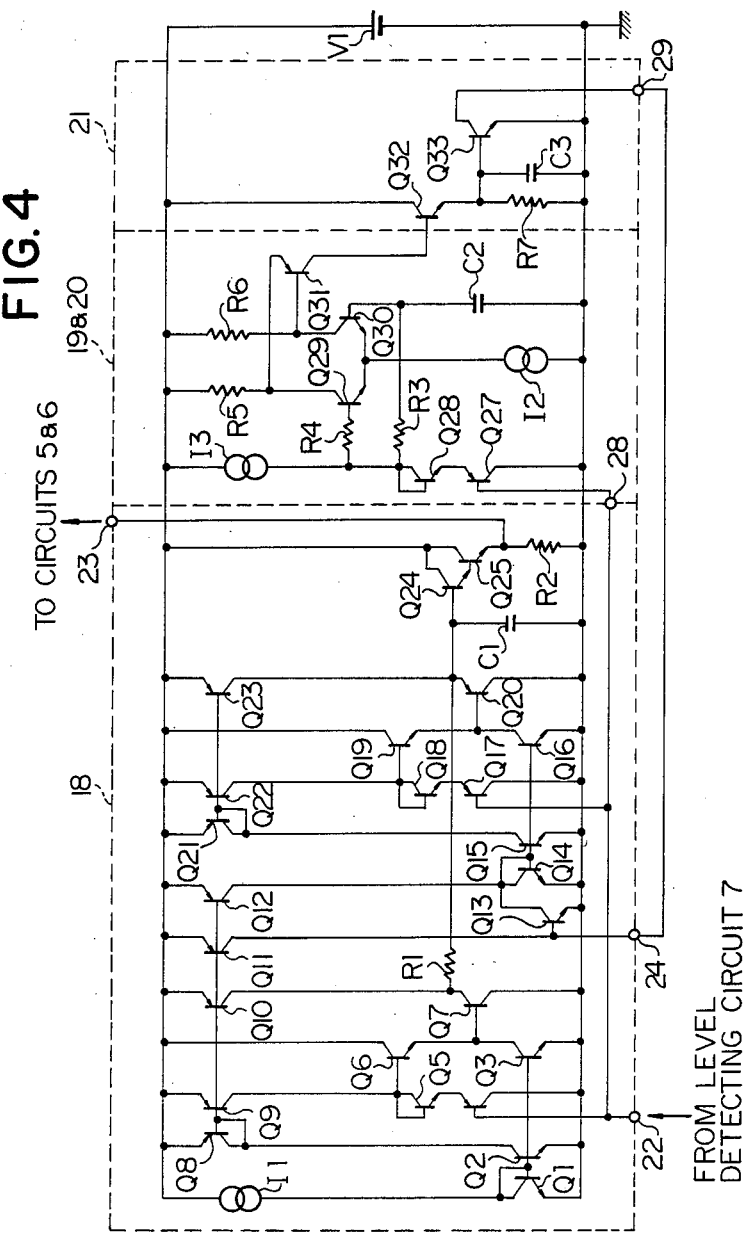
FIG. 4 is a diagram showing the circuit arrangement of an essential part of another FM receiving circuit according to the present invention.

Turning to FIG. 4 of the drawings, the circuit arrangement of the essential part featuring the present invention is illustrated in detail. The essential part illustrated in FIG. 4 is constituted by a low pass filter circuit 18, a high pass filter circuit 19, a rectifying circuit 20 and a driving circuit 21, however the other arrangement is similar to that illustrated in FIG. 2, and, for this reason, no further description is hereinunder incorporated.

In the low-pass filter circuit 18, a source of current I1 and bipolar transistors Q1 to Q3, Q8 to Q12, Q14 to Q16 and Q21 to Q23 form in combination a constant current biasing circuit, and bipolar transistors Q4 to Q7 and bipolar transistors Q17 to Q20 form input buffer circuits, respectively. Bipolar transistors Q24 and Q25 and a resistor R2 as a whole constitute an output buffer circuit, and a bipolar transistor Q13 serves as a switch. A source of current I3 and bipolar transistors Q27 and Q28 as a whole is operative to shift a dc biasing level, and resistors R5 and R6, bipolar transistors Q29 and Q30 and a source of current I2 form in combination a differential amplifier circuit which in turn forms the high-pass filter circuit 19 together with resistors R3 and R4 and a capacitor C2. A bipolar transistor Q31 serves as a rectifying circuit, and the emitter node and the base node thereof are coupled to the respective collector nodes of the bipolar transistors 29 and 30. The time constant determined by the resistor R3 and the capacitor C2 is selected in such a manner as to cope with a gradual variation of a voltage signal supplied to the node 28, and, for this reason, the bipolar transistor Q29 is substantially equal in collector voltage level to the bipolar transistor Q30 in an usual receiving condition, then the bipolar transistor Q31 remains in the off state. When the node 28 is rapidly decreased in voltage level, the base voltage level of the bipolar transistor Q29 follows the rapid decreasing, however, the capacitor C2 allows the bipolar transistor Q30 to keep the base voltage level. This results in that the bipolar transistor Q29 is higher in the collector voltage level than the bipolar transistor Q30. then, the bipolar transistor Q31 turns on. On the other hand, when the node 28 is rapidly increased, the bipolar transistor Q29 is decreased in the collector voltage level with respect to the bipolar transistor Q30, and, for this reason, the bipolar transistor Q31 turns off. In this manner, a rapid decrement in the electric field strength is detected for the FM broadcasting signal. Bipolar transistors Q32 and Q33 and a resistor R7 as a whole constitute the driving circuit 21 and a node 29 is coupled to the control node 24 to propagate the second control signal. The capacitor C1 and the resistor R1 correspond to the capacitor 25 and the resistor 26, respectively.

In operation, if the FM signals are stable in the electric field strength, the bipolar transistors Q31 to Q33 remain off, so that no second control signal is supplied to the control node 24 of the low pass filter circuit 18. Then, the bipolar transistor Q13 turns on but the bipolar transistors Q14 to Q23 are turned off. The low-pass filter circuit 18 provides the time constant determined by the resistance of the resistor R1 and the capacitance of the capacitor C1, and the audio signal component is eliminated from the voltage signal supplied from the level detecting circuit 17, thereby allowing the first control signal to control the muting circuit 15 and the FM demodulation circuit 16 as similar to the prior-art FM receiving circuit.

However, if the FM signals are rapidly decreased in the electric field strength at time t1, the voltage signal produced by the level detecting circuit 17 is also decreased in voltage level as a waveform A. The voltage signal is supplied to not only the low-pass filter circuit 18 but also the high-pass filter circuit 19, and, accordingly, the high-pass filter circuit 19 tailors a waveform B for a differential signal appearing at the collector node of the bipolar transistor Q29. With the differential signal, the rectifier circuit 20 produces a waveform C at the base node of the bipolar transistor Q33, and, for this reason, the bipolar transistor Q33 turns on to cause the bipolar transistor Q13 to turn off. When the bipolar transistor Q13 turns off, the circuitry formed by the bipolar transistors Q14 to Q23 is activated, and, accordingly, the low-pass filter circuit 18 varies the time constant to a value determined by the output impedance of the bipolar transistor Q20 of the emitter follower configuration and the capacitance of the capacitor C1. The time constant is thus decreased in value, so that low-pass filter circuit 18 produces a waveform D for the first control signal which is rapidly lowered in voltage level in comparison with the waveform E produced by the low-pass filter incorporated in the prior-art FM receiving circuit. With the first control signal rapidly decreased, the muting circuit 15 and the FM demodulation circuit 16 are improved in the response characteristics.

Although particular embodiments of the present invention have been shown and described, it will be obvious to those skilled in the art that various changes and modifications may be made without departing from the spirit and scope of the present invention.

What is claimed is:

1. An FM receiving circuit comprising
   (a) a front end section operative to select an FM signal from FM broadcasting signal for producing an intermediate frequency signal on the basis of the FM signal;
   (b) an audio signal producing section supplied with the intermediate frequency signal for producing audio signals and, responsive to a first control signal, for eliminating noise components due to a rapid variation in the electric field strength of the FM signal;
   (c) a level detecting circuit supplied with an intermediate frequency signal transferred from said audio signal producing section for producing a voltage signal representative of an envelope of the intermediate frequency signal;
   (d) a low-pass filter circuit for providing a time constant for producing the first control signal on the basis of the voltage signal and, responsive to a second control signal, for varying the time constant;
   (e) a high-pass filter circuit responsive to the voltage signal representative of the envelope of the intermediate frequency signal and operative to differentiate the voltage signal for producing a differential signal which is representative of an occurrence of said rapid variation in the electric field strength of the FM signal; and
   (f) a rectifier circuit operative to rectify the differential signal for producing said second control signal.

2. An FM receiving circuit as set forth in claim 1, in which said audio signal producing section comprises an FM detecting circuit operative to produce an FM detecting signal on the basis of the intermediate signal, a muting circuit responsive to the first control signal and operative to vary the voltage range of the FM detecting signal, and an FM demodulation circuit operative to produce the audio signals on the basis of the FM detecting signal and responsive to the first control signal for shifting a mode of operation of said FM receiving circuit between a stereophonic mode and a monaural mode.

3. An FM receiving circuit as set forth in claim 2, in which said audio signal producing section further comprises an intermediate frequency signal amplifier circuit coupled between said front end section and said FM detecting circuit.

4. An FM receiving circuit as set forth in claim 3, in which the intermediate frequency signal is supplied from said intermediate frequency signal amplifier circuit to said level detecting circuit.

5. An FM receiving circuit for reproducing audio sounds, comprising:
   (a) a level detecting circuit supplied with an intermediate frequency signal produced on the basis of a tuned FM signal for producing a voltage signal representative of an envelope of the intermediate frequency signal;
   (b) a low-pass filter circuit providing a time constant for producing a first control signal on the basis of the voltage signal and, responsive to a second control signal, for varying the time constant, said first control signal being used for eliminating noises from said audio sounds;
   (c) a high-pass filter circuit responsive to said voltage signal representative of the envelope of the intermediate frequency signal and operative to differentiate the voltage signal for producing a differential signal which is representative of an occurrence of a rapid variation in the electric field strength of the turned FM signal; and (d) a rectifier circuit which is operative to rectify the differential signal for producing said second control signal.

6. An FM receiving circuit comprising (a) an FM detecting circuit operative to detect an FM intermediate frequency signal for producing an FM detecting signal;

(b) a muting circuit having a control node and being responsive to a control signal supplied to the control node for determining whether or not the FM detecting signal is delivered depending upon a voltage level of the control signal;

(c) a level detecting circuit operative to produce a voltage signal which traces an envelope of the FM intermediate frequency signal and being representative of an electric field strength of the FM intermediate frequency signal;

(d) a low pass filter circuit coupled between the level detecting circuit and the control node of the muting circuit for transferring the voltage signal to the muting circuit;

(e) means having a high-pass filter circuit supplied with the voltage signal and being operative to detect a rapid variation of the voltage signal for producing a detecting signal; and (f) means responsive to the detecting signal and being operative to decrease a time constant of the low pass filter circuit or to transfer the voltage signal in substantially bypassing the low pass filter circuit.

7. An FM receiving circuit comprising (a) an intermediate frequency signal amplifying circuit operative to amplify an intermediate frequency signal produced on the basis of an FM broadcasting signal;

(b) an FM detecting circuit coupled to said intermediate frequency signal amplifying circuit and operative to produce an FM detecting signal on the basis of the intermediate frequency signal amplified by said intermediate frequency signal amplifier circuit;

(c) a muting responsive to a first control signal and operative to vary the voltage range of the FM detecting signal;

(d) an FM demodulation circuit operative to produce audio signals on the basis of the FM detecting signal and responsive to the first control signal for shifting a mode of operation of said FM receiving circuit between a stereophonic mode and a monaural mode;

(e) a level detecting circuit supplied with the intermediate frequency signal for producing a voltage signal representative of an envelope of the intermediate frequency signal;

(f) a low-pass filter circuit providing a time constant for producing the first control signal on the basis of the voltage signal and responsive to a second control signal for variation in the time constant;

(g) a high-pass filter circuit operative to differentiate the voltage signal representative of said envelope of the intermediate frequency signal for producing a differential signal representative of an occurrence of a rapid variation in the electric field strength of said FM broadcasting signal; and (h) a rectifier circuit operative to rectify the differential signal for producing said second control signal.

* * * * *